Oct. 25, 1938.  W. THAL  2,134,539
ALTERNATING CURRENT APPARATUS FOR TESTING MAGNETIZABLE MATERIALS
Filed April 4, 1935

INVENTOR
WILHELM THAL
BY
ATTORNEYS.

Patented Oct. 25, 1938

2,134,539

UNITED STATES PATENT OFFICE 2,134,539

ALTERNATING CURRENT APPARATUS FOR TESTING MAGNETIZABLE MATERIALS

Wilhelm Thal, Berlin-Siemensstadt, Germany, assignor to Siemens & Halske, Aktiengesellschaft, Siemensstadt, near Berlin, Germany, a corporation of Germany Application April 4, 1935, Serial No. 14,633
In Germany April 7, 1934

3 Claims. (Cl. 175—183)

My invention relates to alternating current apparatus for testing magnetizable materials.

The majority of methods for testing iron are based on a direct-current measurement. Since, however, such a measurement does not take into consideration the eddy current losses extremely important for all alternating-current instruments and since, furthermore, the results obtained by the direct-current measurement do not hold good for the alternating-current magnetization the Epstein apparatus has been contrived which permits of measuring, in the case of alternating-current, the losses and the alternating-current magnetization within the zone of high saturations, but has the disadvantage that test pieces of great weight must be employed. Besides, various bridge methods have been at the same time contrived for which test pieces of small weight may be employed. However, these methods require a very complicated test equipment without meeting the exacting conditions of an alternating-current apparatus for testing iron. The greatest disadvantage of the bridge methods lies above all in the fact that with bridge methods hitherto known the measurement is not effected with sinusoidal voltage but with sinusoidal current, so that a squeezed or pointed flux curve results. The test readings are, consequently, unavoidably wrong owing to the eddy current component of the higher harmonics in the flux.

The invention has for its object to provide an apparatus which eliminates the above-mentioned drawbacks of the alternating-current apparatus heretofore known for testing iron, i. e., such an apparatus which fulfills all conditions of a cyclic magnetization without presenting the drawbacks or restrictions of the aforesaid apparatus.

An apparatus of the above-indicated character may be manufactured without considerable expenditure, if means are provided to ensure independently of the size of the test pieces the natural magnetization up to the saturation, i. e., if conditions are made to cause the flux to maintain in the test piece the sinusoidal voltage throughout the entire measuring range.

Figure 1:
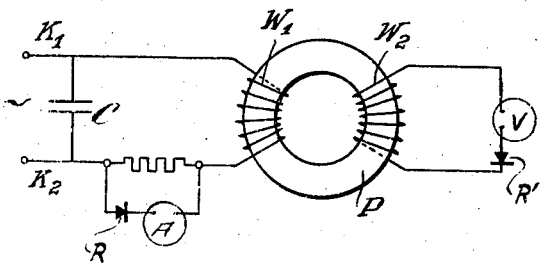
Figure 2:
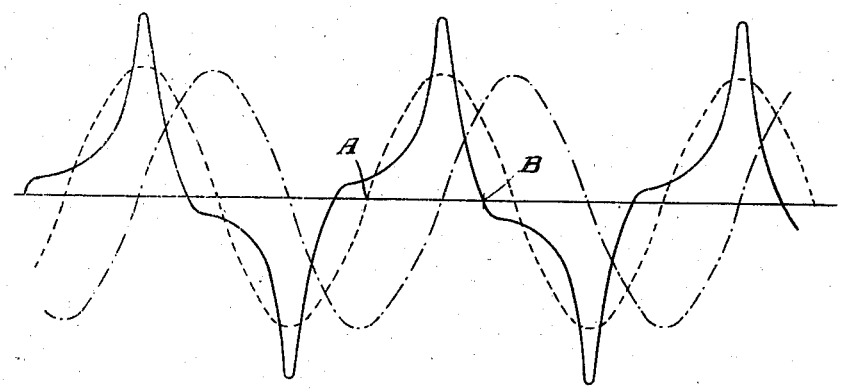
Figure 3:
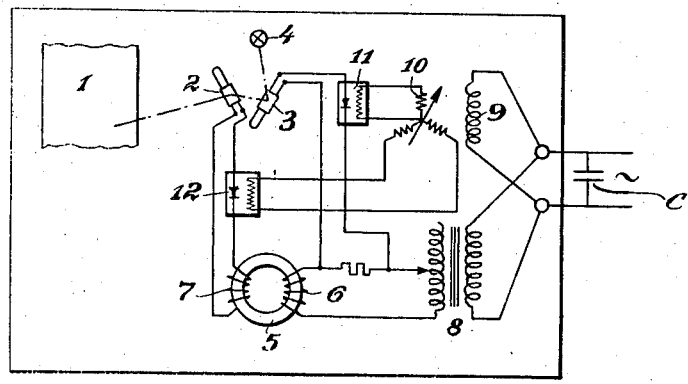

In the accompanying drawing, Fig. 1 is a diagram illustrating the principle of my invention; Fig. 2 is a diagram showing the relation between current, magnetic flux, and induced voltage, and Fig. 3 is a diagram of an apparatus embodying my invention.

For a better understanding of the individual measures required for carrying out the inventive idea Fig. 1 of the accompanying drawing shows diagrammatically in principle the simplest form of iron test, that is to say the current-voltage measurement. An alternating-current source (not shown) is connected to the terminals $K_1$ and $K_2$, the test piece P being energized by the source through the winding $W_1$. The measuring instrument (ammeter) J is inserted in the circuit. The secondary winding $W_2$ is connected to the voltmeter E. Rectifiers R and R' are indicated in series with the ammeter J and the voltmeter E respectively. A condenser C is connected across the connections $K_1$ and $K_2$ of the primary windings and in parallel with the alternating current source. If $i$ designates the magnetizing current, $w_1$ the number of the turns of the primary winding, $w_2$ that of the secondary winding, $e$ the induced secondary E. M. F., $q_f$ the cross-section of the test piece in $cm^2$ and $l_m$ the mean path of the lines of force in $cm$ the following results are then obtained:

$$\frac{A}{cm} = \frac{iw_1}{l_m}$$

$$B_{max} = \frac{e \cdot 10^8}{222 \cdot q_f \cdot w_2} \text{ Gauss}$$

$$\mu = \frac{B_{max}}{H_{eff}}$$

$$H_{eff} = 0.4 \cdot \pi \cdot \frac{A_{eff}}{cm}$$

The expression $$\frac{A}{cm}$$

corresponds in meaning to the otherwise usual expression "ampere windings per centimeter of core length." The expression $B_{max}$ indicates the maximum induction. The expression $\mu$ designates the permeability, $H_{eff}$ the magnetization actually present. In the last formula the index "$eff$" is suitably added, not to $cm$, but to A, as only the value A is variable.

The manner in which the measurement is effected must, consequently, fulfill the condition of a natural magnetization, i. e., the magnetizing current must be table to assume that curve shape which produces a sinusoidal flux in connection with the hysteresis character of the material.

In order to meet the above requirement it is essential that apart from the test piece, there be practically no other linear or non-linear resistances in the primary circuit. The internal losses of the ammeter must be, therefore, very small as compared to the magnetization effect of the test piece. This condition may be fulfilled if a highly sensitive direct-current measuring instrument with series rectifier is employed for measuring the current. Furthermore, the generator supplying the magnetizing current and insulating at the same time the instrument from the supply circuit must have a small total impedance. To this end, a capacity of suitable magnitude may be connected in parallel relation to the generator. Furthermore, the internal losses of the voltmeter connected to the secondary side must also be small, in order that the secondary winding may not react on the primary circuit, and in order that the secondary voltage measurement may approach as far as possible the pure E. M. F. measurement. This may be accomplished also by the use of a highly sensitive direct-current measuring instrument with series-connected rectifier. Finally, it is essential that the greatest possible cross-section of the conductors be chosen so as to maintain the ohmic resistances of both circuits at a very low value.

Briefly stated the following result is obtained: The impedance may be practically fully compensated for by a parallel condenser. A highly sensitive direct-current measuring instrument has internal losses of about $0.1 \cdot 10^{-6}$ watt. If an effect of $10 \cdot 10^{-6}$ watt, i. e. hundred times the amount of an instrument, is substituted for both instruments inclusive of the series and shunt resistances thereof and if the condition is made to cause this effect to amount only to 1% of the magnetization effect of the test piece in order to attain a natural magnetization, a magnetization effect in iron of 1 mva. results.

A simple calculation shows that this amount may be attained for a magnetic flux density $B=10$ in the case of normal sheet irons having as test pieces only a weight of 10 $g$. It is, consequently, possible to carry out accurate alternating current measurements with test pieces having a very small weight, if the above-mentioned rule is adhered to. In practice, however, the conditions are still far more favorable, since the above-indicated figures refer to the complete deflection of the instrument and since the magnetization is besides effected within the zone of the initial permeability with sinusoidal current and voltage curves so that the extreme ratio of the instrument effect to the magnetization effect need not be maintained. In those zones of the magnetizing curve in which this ratio is important, i. e. from about 15 to 20% of the induction in the zone of saturation, the magnetization effect is higher by $10^2$ to $10^3$ so that the natural magnetization is at all events ensured. In practice the measurement of a test piece of 10 g. independently of the quality of the material is, therefore, possible.

A particularly convenient realization of the above-described inventive idea results from the consideration that all magnetical values of a material are based on the hysteresis loop, and that, therefore, the utilization of the inventive idea for the design of an apparatus which enables the recording of any points whatever of the hysteresis loop represents a considerable advance as to the testing of magnetizable materials, provided that the apparatus is simple to manipulate. To this end, a coordinate indicator or recording apparatus is employed according to the invention, i. e., an apparatus which indicates the relationship between two values on a surface scale. Such an apparatus consists, for instance, of two mirror galvanometers, whose axes of rotation of the mirrors are perpendicular to one another.

A ray of light falling on the two mirrors in succession is, consequently, reflected by the same in two planes perpendicular to each other and may indicate on a surface scale the relationship between both values which influence the position of the mirrors. The measuring loops of such an indicating or recording apparatus are connected according to the invention to the primary circuit or to the secondary circuit of a piece of the magnetizable material under test in such a manner that the one mirror deflects in accordance with the instantaneous intensity of the exciting current and the other mirror deflects in accordance with the instantaneous density of the flux. Since the flux cannot be directly measured the induced voltage is instead thereof measured according to the invention. Since, however, the flux and the secondary voltage are 90° out of phase, the values of the induced secondary voltage leading 90° are measured as such values which correspond to the instantaneous values of current. This substitution of the instantaneous values of the induced voltage for those of the flux may be easily effected in the case of a sinusoidal behavior of the voltage, since in this case also the flux varies sinusoidally.

To measure the instantaneous values of the current or of the induced voltage any of the arrangements hitherto known such as, for instance, Joubert discs or instead thereof vibrating contact synchronous switches with separate excitation, for instance as described in Patent No. 1,931,267 to H. Pfannenmuller, may be employed. For instance, also independently controlled dry rectifiers may be employed.

In order to plot predetermined points of the hysteresis loop the measurement must be based within a full period on a series of instantaneous values of the current curve. To this end, an ordinary phase shifter having a range of 360° is employed by means of which a synchronous motor is fed when using Joubert discs.

By the use of independently controlled oscillating or static rectifiers the exciting voltage of these rectifiers is supplied by the phase shifter, i. e., two voltages which are 90° out of phase are tapped off in such a connection that for any rotation of the phase shifter the relative phase position of both exciting voltages supplied by the phase shifter remains unaltered.

The measurement of the induced secondary voltage is only permissible, if the magnetization is sinusoidal. However, in the case of the above-described arrangement oscillating rectifiers are employed at the secondary side which cause the measuring instrument connected behind the same to indicate a deflection depending upon the arithmetical mean. Since according to the known relation the arithmetical mean of the voltage corresponds to the maximum value of the flux, the arrangement may be also employed, if the magnetization is not sinusoidal.

To explain the above, Fig. 2 shows the relationship between the alternating-current magnetic flux and the induced voltage. The solid curve represents the exciting current. The dotted wave train represents the flux in the test piece which is in phase with the energizing current and the dot-and-dash wave train illustrates the induced secondary voltage lagging the flux by 90°. Since the wave trains of the flux and voltage are similar to each other in the case of the sine shape, the flux may be replaced by the voltage which is capable of being measured directly. The peak value of the current, consequently, corresponds to the peak value of the induced voltage. If the instantaneous value of the current is determined at the point designated by A at which the voltage and, therefore, also the flux pass the zero value, the instantaneous value of the current corresponds to the coercive force, where as at point B where the current has decreased to zero, the voltage value measured corresponds to the remanence.

The same values may be obtained by the points in intersection of the hysteresis curve with the axes of ordinates and abscissae. Consequently, if, for instance, only these values are to be determined the phase shifter may only be so adjusted that in the case of the remanence measurement the instantaneous value of the induced voltage and in the case of the coercive force measurement the instantaneous value of the current become zero. The other ordinates indicate then the corresponding value of the coercive force and of the remanence respectively.

Fig. 3 illustrates the diagram of connections of an arrangement according to the invention. The condenser C is connected across the leads which connect the system to the alternating current source. 1 denotes the recording surface. 2 and 3 are the loops and mirrors of both galvanometers. 4 is the luminous source from which a sharply limited ray of light falls on the recording surface 1 by the way of both mirrors 2 and 3. 5 is the iron test piece. 6 is the primary and 7 the secondary winding of this test piece. The primary winding 6 is connected to the secondary winding of a transformer 8 whose secondary voltage may be adjusted at will. 9 denotes the primary and 10 the secondary winding system of an induction regulator or phase-shifter. Two phases 90° out of phase are tapped from the secondary winding and serve to energize two separately controlled switching arrangements 11 and 12. The synchronous switching arrangement 11 controls the connection between the primary circuit 6 and the measuring loop 3 in such a manner that the same instantaneous values are taken from each phase. The synchronous switching arrangement 12 controls in the same manner the secondary circuit 7 of the test piece 5, however, with the difference that the instantaneous values obtained and the instantaneous value of the current are 90° out of phase. The galvanometers 2 and 3 constitute a voltmeter and an ammeter respectively, and each of them is connected in series with the rectifier forming part of the switching arrangement 12 and 11 respectively.

The zero point of the coordinate system on the surface 1 is given by the luminous point 4 which is projected by the deenergized galvanometer systems 2 and 3 on the recording surface. Instead of this recording surface a screen may be used which is designed preferably as an opaque disc. The regulating transformer 8 serves to adjust the desired sensitiveness or the desired induction. The range of measurement of the arrangement may be adjusted at will by the number of turns 6 and 7 wound on the test piece 5.

I claim as my invention:

1. In an alternating current device for measuring magnetic properties of a test piece, in combination, a closed magnetic circuit, at least part of which is the test piece, primary and secondary windings on said magnetic circuit, an alternating current source of negligible total impedance with respect to the impedance of said primary winding, said source being connected with said primary winding, a revolvable mirror and means connected in the primary circuit for deflecting said mirror, a second revolvable mirror and means connected in the secondary circuit for deflecting said second mirror, the axes of revolution of said mirrors being perpendicular to each other, a light source and a surface scale being arranged with respect to said mirrors so that a light beam coming from said light source is reflected successively by said two mirrors onto said surface scale, a separately excited synchronous switch arranged in said primary circuit for periodically interrupting said circuit, a second separately excited synchronous switch arranged in said secondary circuit for periodically interrupting said secondary circuit, and means for exciting said two switching devices, said means being electrically coupled with said current source and designed for exciting said two switches with 90° phase displacement against each other and with a certain phase position with respect to the current of said current source, whereby the instantaneous value of the primary current acts on said means for deflecting said first-mentioned mirror and the instantaneous value of the voltage induced in said secondary windings acts on said means for deflecting said second mirror.

2. In an alternating current device for measuring magnetic properties of a test piece, in combination, a closed magnetic circuit, at least part of which is the test piece, primary and secondary windings on said magnetic circuit, an alternating current source connected in a primary circuit with said primary winding, impedance balancing means connected in said primary circuit for compensating the impedance of said current source, a revolvable mirror and means connected in the primary circuit for deflecting said mirror, a second revolvable mirror and means connected in the secondary circuit for deflecting said second mirror, the axes of revolution of said mirrors being perpendicular to each other, a light source and a recording surface being arranged with respect to said mirrors so that a beam coming from said light source is reflected successively by said two mirrors onto said recording surface, a separately excited synchronous switch arranged in said primary circuit for periodically interrupting said circuit, a second separately excited synchronous switch arranged in said secondary circuit for periodically interrupting said secondary circuit, and means for exciting said two switching devices, said means being electrically coupled with said current source and including a phase shifter for producing a phase displacement of 90° between the action of said two switches and a phase position of this action with respect to said current source at which the instantaneous value of the primary current acts on said means for deflecting said first-mentioned mirror and the instantaneous value of the voltage induced in said secondary windings acts on said means for deflecting said second mirror.

3. In an alternating current device for measuring magnetic properties of a test piece, in combination, a closed magnetic circuit, at least part of which is the test piece, primary and secondary windings on said magnetic circuit, an alternating current source of negligible total impedance with respect to the impedance of said primary winding, said source being connected with said primary winding, a highly sensitive direct current measuring device connected in the electric circuit of said primary winding and having a rotatable mirror as actuated member, a second highly sensitive direct current measuring device connected in the circuit of said secondary winding and having also a rotatable mirror forming its actuated member, a light source and a screen having a support common with said two measuring devices, said devices, said light source and said screen being arranged on said common support so that the rotation axes of said devices are perpendicular with respect to each other and a beam coming from said light source is reflected successively by said two mirrors onto said screen, a separately excited synchronous switch arranged in said primary circuit for periodically interrupting said circuit, a second separately excited synchronous switch arranged in said secondary circuit for periodically interrupting said secondary circuit, and means for exciting said two switching devices, said means including a phase shifter electrically coupled with said current source and designed for supplying two exciting voltages of 90° phase difference to said switches, whereby said two switches and said measuring devices connected with said switches are actuated in accordance with the current of said primary winding and the voltage of said secondary winding respectively.

WILHELM THAL.